United States Patent
Chiang et al.

(10) Patent No.: US 7,505,439 B2
(45) Date of Patent: Mar. 17, 2009

(54) SYSTEM AND METHOD FOR MANAGING CDMA COMMUNICATION SYSTEM CAPACITY USING POWER-BASED METRICS

(75) Inventors: Chih-Ming J. Chiang, Chandler, AZ (US); Daniel R. Tayloe, Phoenix, AZ (US); Mark H. Kaya, Scottsdale, AZ (US)

(73) Assignee: Motorola, Inc., Schaumburg, IL (US)

( * ) Notice: Subject to any disclaimer, the term of this patent is extended or adjusted under 35 U.S.C. 154(b) by 366 days.

(21) Appl. No.: 11/027,144

(22) Filed: Dec. 29, 2004

(65) Prior Publication Data

US 2006/0153140 A1   Jul. 13, 2006

(51) Int. Cl.
*H04B 7/216* (2006.01)
(52) U.S. Cl. .................................. 370/335; 370/342
(58) Field of Classification Search ................. 370/320, 370/335, 342; 455/452.1, 522
See application file for complete search history.

(56) References Cited

U.S. PATENT DOCUMENTS

| 6,944,147 B2 * | 9/2005 | Chheda ..................... 370/342 |
| 2004/0120290 A1 * | 6/2004 | Makhijani et al. .......... 370/335 |
| 2004/0192315 A1 * | 9/2004 | Li et al. ...................... 455/447 |

\* cited by examiner

*Primary Examiner*—Barry W Taylor (57) ABSTRACT

A CDMA system according to an embodiment of the invention employs a technique for power optimized user loading that obtains a desired allocation of different radio configuration calls. The technique takes advantage of the relatively low power requirements of RC3 calls for low load conditions, while increasing the number of RC4 calls for high load conditions. As the load increases, the system determines a target combination of RC3 and RC4 calls based upon the current average power per link measurements for RC3 and RC4 calls, and based upon the power limitations of the system. The technique strives to maximize the capacity of the system while maintaining operation below the overall power limit.

16 Claims, 5 Drawing Sheets

SYSTEM AND METHOD FOR MANAGING CDMA COMMUNICATION SYSTEM CAPACITY USING POWER-BASED METRICS

TECHNICAL FIELD

The present invention relates generally to code division multiple access ("CDMA") communication systems. More particularly, the present invention relates to a technique for managing calls that utilize different radio configurations.

BACKGROUND

The prior art is replete with CDMA communication systems, including cellular telephone systems that can handle voice and/or data traffic. Briefly, a CDMA system utilizes binary orthogonal codes to enable multiple users to occupy the same time and frequency allocations within the system. The codes enable a CDMA system to establish multiple communication channels using a shared frequency spectrum. A system configured in accordance with CDMA 1× technology utilizes two primary radio configuration modes to carry information, namely, RC3 and RC4. The RC3 mode utilizes 64 Walsh codes, each of which is 64 bits long. Three of the RC3 Walsh codes are reserved for overhead use, namely, one pilot channel, one paging channel, and one sync channel per base station transceiver subsystem ("BTS"). Consequently, in a practical system, 61 RC3 Walsh codes are available to support user calls.

The RC4 mode utilizes 128 Walsh codes, each of which is 128 bits long. Two related RC4 Walsh codes can be derived from a single RC3 Walsh code. Accordingly, although only 61 RC3 Walsh codes are available to support user calls, 122 RC4 Walsh codes are available to support user calls. The RC4 mode, however, requires more power (on average) per forward link than the RC3 mode. Specifically, RC4 calls require approximately 10% more operating power than RC3 calls. Consequently, older generation CDMA systems having strict power consumption requirements do not support RC4 calls. Furthermore, until recent improvements in practical CDMA system power consumption, a CDMA system that exclusively handled RC3 calls would typically consume all of its available operating power (from the BTS perspective) before exhausting the supply of RC3 Walsh codes. Current systems, theoretically, may assign all of the available RC3 Walsh codes while having excess operating power to spare. In a practical CDMA system, however, only a relative few BTS sector-carriers experience loading significant enough to consume all of the available RC3 Walsh codes. Thus, using RC4 Walsh codes for all calls in such a practical system would result in excessive power consumption for the majority of the sites in the system.

A practical system that utilizes the RC4 mode for all calls would likely run out of power before exhausting all of the available RC4 Walsh codes. A CDMA system that supports both RC3 and RC4 modes can therefore take advantage of the practical tradeoff between limited system resources for operating power and Walsh code availability. In general, a power limited system that uses a mix of RC3 and RC4 calls can realize a higher capacity than a system that uses only one or the other. In practice, the total number of users, the number of RC3 users, the number of RC4 users, the average power consumption per RC3 user, and the average power consumption per RC4 user will dynamically vary as each BTS in the system establishes new calls, accepts hand-in calls, terminates existing calls, and hands off calls.

Accordingly, it is desirable to have a methodology and system for providing a practical balance of RC3 and RC4 calls within a CDMA system. In addition, it is desirable to have a methodology and system that seeks to minimize interference in deployments where RC3 loading is not excessive. Furthermore, other desirable features and characteristics of the present invention will become apparent from the subsequent detailed description and the appended claims, taken in conjunction with the accompanying drawings and the foregoing technical field and background.

BRIEF DESCRIPTION OF THE DRAWINGS

A more complete understanding of the present invention may be derived by referring to the detailed description and claims when considered in conjunction with the following figures, wherein like reference numbers refer to similar elements throughout the figures.

DETAILED DESCRIPTION

The following detailed description is merely exemplary in nature and is not intended to limit the invention or the application and uses of the invention. Furthermore, there is no intention to be bound by any expressed or implied theory presented in the preceding technical field, background, brief summary or the following detailed description.

The invention may be described herein in terms of functional and/or logical block components and various processing steps. It should be appreciated that such block components may be realized by any number of hardware, software, and/or firmware components configured to perform the specified functions. For example, an embodiment of the invention may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that the present invention may be practiced in conjunction with any number of CDMA systems and that the system described herein is merely one exemplary application for the invention.

For the sake of brevity, conventional techniques related to CDMA systems, CDMA call processing, data transmission, signaling, and other functional aspects of the systems (and the individual operating components of the systems) may not be described in detail herein. Furthermore, the connecting lines shown in the various figures contained herein are intended to represent example functional relationships and/or physical couplings between the various elements. It should be noted that many alternative or additional functional relationships or physical connections may be present in a practical embodiment.

Figure 1:
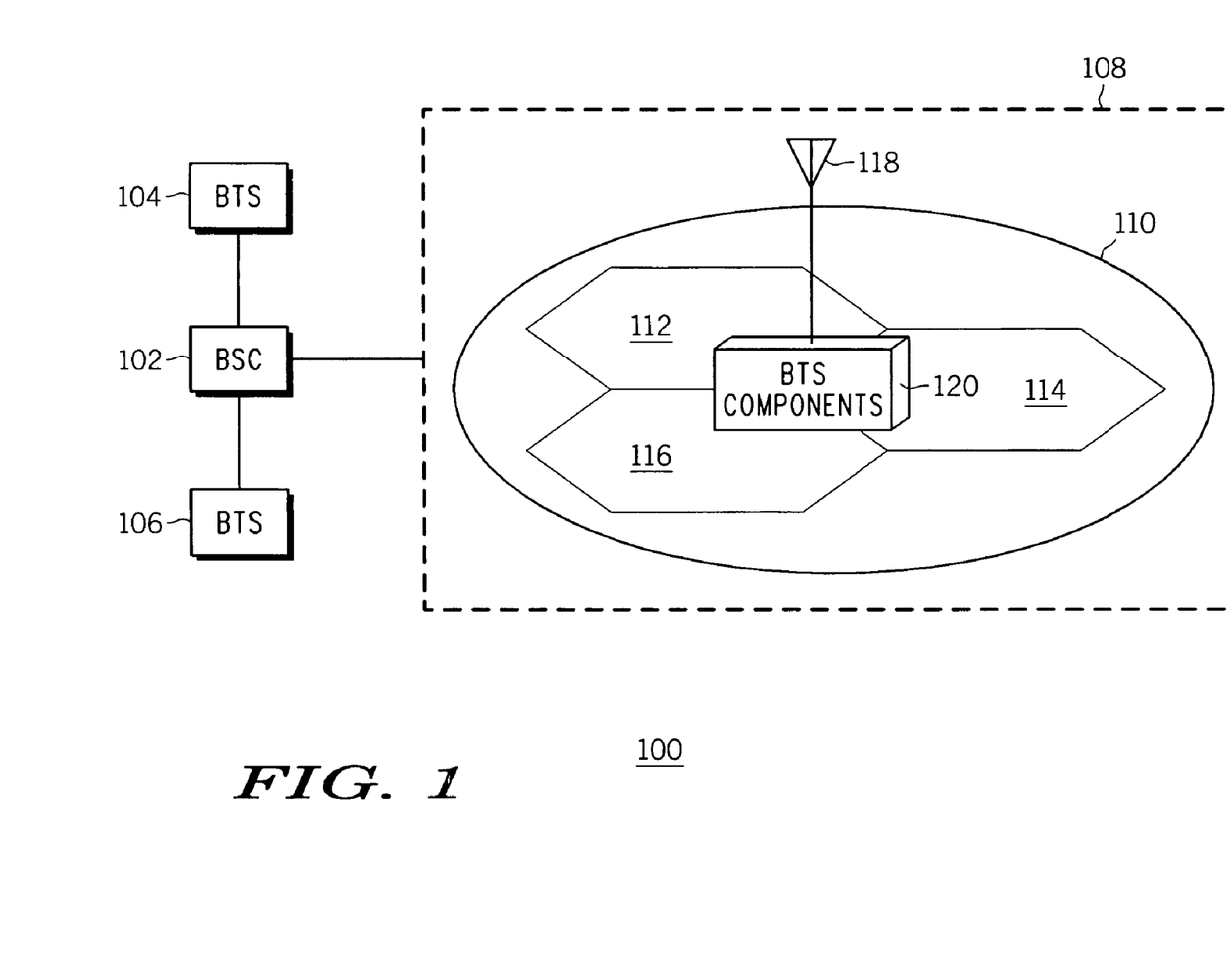
FIG. 1 is a schematic representation of a portion of a CDMA system.

FIG. 1 is a simplified schematic representation of a portion of a CDMA system 100, which may be suitably configured in accordance with an embodiment of the invention. CDMA system 100 includes a controller component, e.g., a base station controller ("BSC") 102, which may communicate with and be coupled to any number of BTSs (identified by reference numbers 104, 106, and 108). In accordance with conventional CDMA systems, BSC 102 may be coupled to the public switched telephone network (not shown) to facilitate communications between traditional telephone users and mobile stations such as cellular telephones. BSC 102 is suitably configured to control and manage the operation of BTSs 104/106/108, and may perform call switching, traffic management, and other services for CDMA system 100. BSC 102 may also be configured to carry out a number of the techniques and processes described herein.

Figure 3:
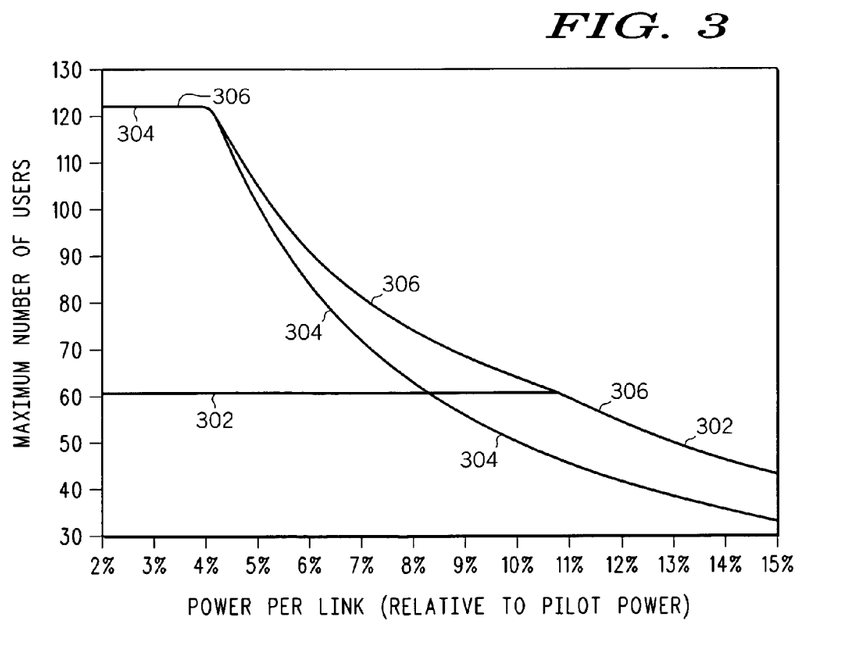
FIG. 3 is a graph depicting the call capacity as a function of average power per user/link for different RC3/RC4 call allocation schemes.

Traditionally, a BTS refers to a fixed station for communicating with mobile stations. The term "BTS" is often used in different contexts to refer to a cell, a sector within a cell, or the physical equipment that actually performs the BTS functions. Generally, a BTS establishes the wireless link between the mobile stations and CDMA system 100. In practice, a BTS is the subsystem that actually generates the CDMA signal and transmits the signal to the mobile stations. For purposes of this description, BTS 108 is associated with a cell 110 divided into three sectors (identified by reference numbers 112, 114, and 116). In accordance with known techniques, BTS 108 may employ a directional antenna arrangement 118 that enables cell 110 to be divided into sectors 112/114/116. BTS 108 may include one or more devices, components, or subsystems 120 configured to perform various functions and processes necessary to support the operation of CDMA system 100. For example, FIG. 3 depicts several functional elements that may be associated with a BTS configured in accordance with an embodiment of the invention.

In a practical system, one CDMA user call may have multiple "legs" or connections associated with multiple sectors and/or cells; the use of multiple legs facilitates soft handoffs between sectors or cells. For a simple voice call, each leg will utilize one Walsh code, and each leg supporting a single call will be of the same radio configuration. On the other hand, several Walsh codes may be required to support a single high-speed or high-rate data call, e.g., up to 16 RC3 Walsh codes for a single 144 Kilobit per second data call.

In a practical embodiment, BSC 102 and each BTS in CDMA system 100 may include logical or functional elements realized by hardware, software, firmware, or any combination thereof, such as one or more processors, controllers, memory elements, or the like. In accordance with the practices of persons skilled in the art, embodiments of the invention may be described herein with reference to symbolic representations of operations that may be performed by various logical, functional, or processor-based components. Such operations are sometimes referred to as being computer-executed, computerized, software-implemented, or computer-implemented. It will be appreciated that operations that are symbolically represented include the manipulation by the various microprocessor devices of electrical signals representing data bits at memory locations in the system memory, as well as other processing of signals. The memory locations where data bits are maintained are physical locations that have particular electrical, magnetic, optical, or organic properties corresponding to the data bits.

When implemented in software or firmware, various elements of the systems described herein (which may reside at BSC 102, the BTSs, or elsewhere in a practical CDMA system) are essentially the code segments or instructions that perform the various tasks. The program or code segments can be stored in a processor-readable medium or transmitted by a computer data signal embodied in a carrier wave over a transmission medium or communication path. The "processor-readable medium" or "machine-readable medium" may include any medium that can store or transfer information. Examples of the processor-readable medium include an electronic circuit, a semiconductor memory device, a ROM, a flash memory, an erasable ROM (EROM), a floppy diskette, a CD-ROM, an optical disk, a hard disk, a fiber optic medium, a radio frequency (RF) link, or the like. The computer data signal may include any signal that can propagate over a transmission medium such as electronic network channels, optical fibers, air, electromagnetic paths, or RF links.

For purposes of the example embodiment described herein, CDMA system 100 employs CDMA 1× technology, which is capable of utilizing RC3 and RC4 for calls. The RC3 mode utilizes a first category of codes (e.g., RC3 Walsh codes), to facilitate communication between a BTS and a mobile station, where an RC3 Walsh code is represented by a sequence of 64 bits. In contrast, the RC4 mode utilizes a second category of codes (e.g., RC4 Walsh codes) to facilitate communication between a BTS and a mobile station, where an RC4 Walsh code is represented by a sequence of 128 bits. Although RC3 calls require less average power than RC4 calls, the number of potential RC3 users is less than the number of potential RC4 users. Generally, the invention relates to a call allocation technique that manages the number of RC3 and RC4 calls supported by a BTS such that RC3 calls dominate at lower user load levels, while at higher user load levels, the mix of RC3 and RC4 calls is chosen to maximize the ultimate load capacity of the system. At higher load levels, the call allocation technique considers the current average power per leg for RC3 calls and the current average power per leg for RC4 calls, then calculates a desired RC3/RC4 balance that would maximize the number of users. The balancing of call configurations results in a desirable mix of RC3 calls (each of which has a relatively low average power consumption per forward link) and RC4 calls (each of which has a relatively high average power consumption per forward link in comparison to RC3 calls). In a practical CDMA system, the loading of most sector-carriers is such that Walsh code blocking is not an issue. In such a system, unnecessary use of RC4 coding wastes power and system capacity, and increases interference in the system, which could lead to an increase in lost calls and call set-up failures.

Figure 2:
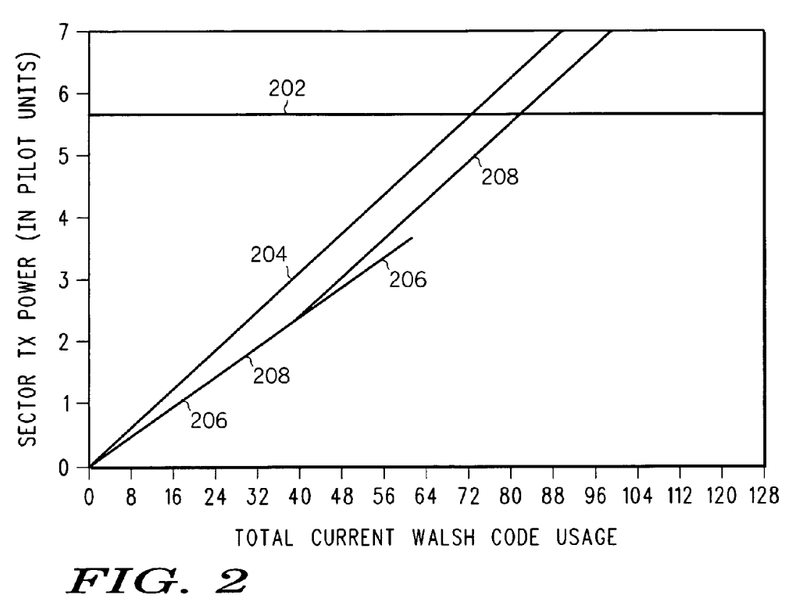
FIG. 2 is a graph depicting the call capacity for different RC3/RC4 call allocation schemes.

FIG. 2 is a graph depicting the call capacity for different RC3/RC4 call allocation schemes. This graph, which merely reflects typical examples, depicts activity corresponding to one sector-carrier associated with a BTS. The vertical scale represents the sector transmit power (expressed in the number of pilot units, where one pilot unit is the transmit power of the CDMA pilot channel), and the vertical scale is applicable to both RC3 and RC4 calls. In a CDMA system, traffic channel power is often measured in reference to the pilot channel power. In a loaded carrier, a pilot might occupy 15% of the carrier power, the paging channel might occupy 7.5% of the carrier power, and the sync channel might occupy 1.5% of the carrier power, leaving 76% of the carrier power available for the traffic channels. Thus, 76% for the traffic channels versus 15% for the pilot gives the traffic channel 5.1 times the pilot power in this example. In practice, a maximum of 61 RC3 Walsh codes and a maximum of 122 RC4 Walsh codes can be assigned to user calls (the remaining Walsh codes are reserved for overhead channels). Consequently, the horizontal scale of the graph extends beyond 61 to accommodate the 122 RC4 Walsh codes. The horizontal scale represents the total current number of Walsh codes in use by the CDMA system, which may reflect RC3 Walsh codes, RC4 Walsh codes, or a combination thereof. Briefly, FIG. 2 depicts an example of an RF power limit 202 for the sector-carrier, which represents the maximum practical power output for the sector-carrier, a plot 204 corresponding to a call allocation scheme that exclusively uses RC4 codes, a plot 206 corresponding to a call allocation scheme that exclusively uses RC3 codes, and a plot 208 corresponding to a call allocation scheme according to an example embodiment of the invention. Notably, plot 208 and plot 206 are identical at lower load levels (e.g., below approximately 40).

As depicted by plot 204, RC4 calls consume more sector transmit power than RC3 calls for a given number of users. As depicted by plot 206, the practical number of RC3 calls, however, is limited to 61. Consequently, the RC4-exclusive scheme can be employed to support additional users while still remaining below RF power limit 202. As depicted by plot 208, a call allocation technique according to the invention provides a desirable RC3/RC4 mix that results in lower sector transmit power than the RC4-exclusive scheme for a given load level. Furthermore, a call allocation technique according to the invention provides a desirable RC3/RC4 mix that results in a higher maximum user count (for the given RF power limit 202) than either the RC3-exclusive scheme or the RC4-exclusive scheme.

One example call allocation technique employed by CDMA system 100 can be explained with reference to plot 208 in FIG. 2. Plot 208 represents a hypothetical situation where only RC3 Walsh codes are in use at lower load levels; in this example, CDMA system 100 strives to establish and maintain only RC3 calls at load levels below approximately 30-45 users. In the example embodiment of the invention, the threshold under which all calls are RC3 is static. In one practical implementation, RC3 is employed as the "default" configuration for calls, and all new calls are established using RC3 codes at relatively low load levels to take advantage of the lower power requirements for RC3 calls. This ensures that CDMA system 100 will Walsh code limit before it power limits. Of course, in a practical embodiment, there may be a blend of RC3 and RC4 Walsh codes in use at any given time due to hand-in traffic, Walsh code fragmentation, or other system or call traffic nuances that may impact the allocation of radio configurations.

At load levels below the RC3 usage threshold (which may vary from one system to another), plot 208 is identical to the RC3-exclusive plot 206. At load levels above the RC3 usage threshold, however, plot 208 diverges from plot 206, as shown in FIG. 2. At the RC3 usage threshold, the call allocation technique utilizes a suitably configured RC3/RC4 capacity optimization algorithm to determine a desirable mix of RC3 and RC4 calls (the capacity optimization algorithm is ignored or disabled at load levels below the RC3 usage threshold). In this regard, CDMA system 100 can activate the RC3/RC4 balancing feature for heavily loaded sector-carriers that could potentially benefit from running a mix of lower power RC3 calls having less available codes and higher power RC4 calls having more available codes. The call allocation technique results in a higher call capacity for the given RF power limit 202.

In response to the desired call allocation, CDMA system 100 can establish new calls using either RC3 or RC4. It should be noted that the optimum balance of RC3 users and RC4 users is such that there may need to be very few low power RC3 users and many high power RC4 users. For example, an optimum combination of RC3 and RC4 users given certain power usage conditions for a particular sector-carrier might be eighteen RC3 users and eighty RC4 users. As the load on this sector-carrier initially increases, it will be at a level below the RC3 usage threshold. When the RC3 usage threshold is exceeded for the first time, there will be, for example, forty RC3 users rather than the desired optimum mix of only eighteen RC3 users. However, since the average call hold time for voice calls is only 100 seconds, in under two minutes the call mix can be changed to achieve the desired balance. In addition, the new call arrival rate is relatively low—each sector has 122 maximum potential calls but an average of only two new calls per two-second reporting period. In a practical system, the desired RC3 operating target may vary significantly from one two-second reporting period to the next. Such variation may be caused, for example, by high speed SCH data connections that require a large number of Walsh code resources for a short period of time. The relatively low call arrival rate, however, naturally smoothes out such variations in operating point targets, and, in practice, the two-second reporting period influences only a few new calls.

FIG. 3 is a graph depicting the call capacity as a function of average power per user/link for different RC3/RC4 call allocation schemes. This graph, which merely reflects typical examples, depicts activity corresponding to one sector-carrier associated with a BTS. The vertical scale represents the maximum number of users, and the horizontal scale represents the average power per link/user ("PPL") at a particular operating time for CDMA system 100. The PPL is expressed as a percentage of pilot power. Briefly, FIG. 3 depicts an RC3 plot 302 corresponding to a call allocation scheme that exclusively uses RC3 codes, an RC4 plot 304 corresponding to a call allocation scheme that exclusively uses RC4 codes, and an RC3/RC4 plot 306 corresponding to a call allocation scheme according to an example embodiment of the invention. Notably, RC4 plot 304 and RC3/RC4 plot 306 are similar at lower PPL ratings (e.g., below approximately 4%), while RC3 plot 302 and RC3/RC4 plot 306 are similar at higher PPL ratings (e.g., above approximately 10.5%).

In FIG. 3, the flat plot sections represent Walsh code limited conditions, while the curved plot sections represent carrier power limited conditions. As depicted in FIG. 3, due to the relatively low operating power required for RC3 calls, the maximum number of users is constant for RC3 plot 302 at lower PPL ratings. The example plot 302 represents the practical limitation of RC3 calls, namely, at relatively high PPL ratings (above approximately 10.5% in this example), fewer than the theoretical maximum number of RC3 calls can be established before reaching the carrier power limit. At relatively low PPL ratings, however, the system runs out of RC3 Walsh codes before reaching the carrier power limit. In contrast, due to the relatively high operating power required for RC4 calls, the maximum number of users for RC4 plot 304 decreases with increasing PPL ratings once the PPL rating rises above approximately 4.5%. RC3/RC4 plot 306, however, demonstrates an example embodiment where the maximum number of users across the entire PPL range is greater than or equal to either RC3 or RC4 alone. RC3/RC4 plot 306 is achieved by a call allocation technique that assesses the RF environment for a sector-carrier, namely, measuring the average PPL of the different radio configurations to determine how best to allocate Walsh codes to calls. A call allocation technique according to the invention considers the current Walsh code and RF power constraints of the sector-carrier and determines the RC3/RC4 mix that yields the maximum number of users/links.

Figure 4:
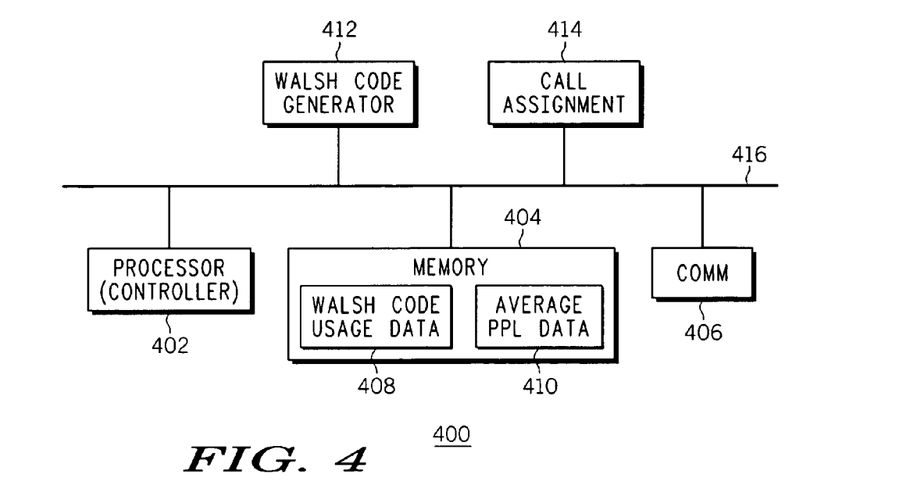
FIG. 4 is a schematic representation of a component of a CDMA system configured in accordance with an embodiment of the invention.

FIG. 4 is a schematic representation of a component, such as a BTS 400, of a CDMA system configured in accordance with an embodiment of the invention. Although not shown in FIG. 4, a practical BTS 400 will include a number of functional elements, logical elements, and/or hardware components that support conventional CDMA system features and functions unrelated to the invention. BTS 400 generally includes a processor (or controller) 402, a suitable amount of memory 404, a data communication element 406, Walsh code usage data 408 (which may be received by BTS 400 and stored in memory 404), average PPL data 410 (which may be measured or otherwise received by BTS 400 and stored in memory 404), a Walsh code generator 412, and a call assignment element 414. BTS 300 may include a data bus 416 to facilitate communication of data or control signals between some or all of the above components.

Processor 402 may be any general purpose microprocessor, controller, or microcontroller that is suitably configured to control the operation of BTS 400, or at least govern the processes described herein. Memory 404 may be realized as any processor-readable medium, including an electronic circuit, a semiconductor memory device, a ROM, a flash memory, an erasable ROM, a floppy diskette, a CD-ROM, an optical disk, a hard disk, an organic memory element, or the like. As described in more detail below, memory 404 is capable of storing Walsh code and/or call usage data 408 received from a BSC. In addition, memory 404 is capable of storing average PPL data 410 measured by BTS 400.

Communication element 406 is configured to communicate with the BSC that controls the operation of BTS 400. In particular, communication element 406 is suitably configured to receive Walsh code usage data 408 from the BSC, and to provide call assignment instructions to the BSC. In this regard, communication element 406 and any corresponding logical or software elements, individually or in combination, are example means for obtaining a current number of codes in use. In the example embodiment, communication element 406 communicates with the BSC in accordance with data communication protocols and techniques utilized by known CDMA systems. Communication element 406 may be realized with hardware, software, and/or firmware using known techniques and technologies.

Walsh code generator 412 may be realized as processing logic configured to derive RC4 Walsh codes from related RC3 Walsh codes, to distill RC4 Walsh codes into root RC3 Walsh codes, and to otherwise process the different codes as further described herein. Walsh code generator 412 may be utilized during the RC3/RC4 call assignment processes described herein. Call assignment element 414 may also be realized as processing logic configured to assign specific radio configurations to call traffic supported by BTS 400. Call assignment element 414 is preferably configured to perform the various analyses and determinations described in more detail herein. In this regard, call assignment element 414 and any corresponding logical or software elements, individually or in combination, is an example means for assigning a radio configuration to a new call. In addition, call assignment element 414, processor 402, and any corresponding logical or software elements, individually or in combination, are example means for computing a target combination of RC3/RC4 calls as described in more detail herein.

Generally, the various functional and logical elements depicted in FIG. 4 are suitably configured to carry out the call assignment and optimizing techniques described herein. In practice, each BTS in a CDMA system may include such added functionality to enable system-wide optimization of call loading. Briefly, the CDMA system uses average PPL measurements to obtain a quantitative assessment of the RF environment, which in turn can be utilized to calculate a desired RC3/RC4 call mix to maximize the capacity of the sector-carrier. The addition of a default RC3 assignment protocol for low load situations, coupled with a Walsh code load threshold to enable or disable a PPL optimization algorithm for all but highly loaded sector-carriers helps to reduce overall system RF interference and leaves the maximum possible power in reserve for the occasional very high power, high speed data user. Minimum system interference also reduces dropped calls and call set-up failures in the CDMA system.

Figure 5:
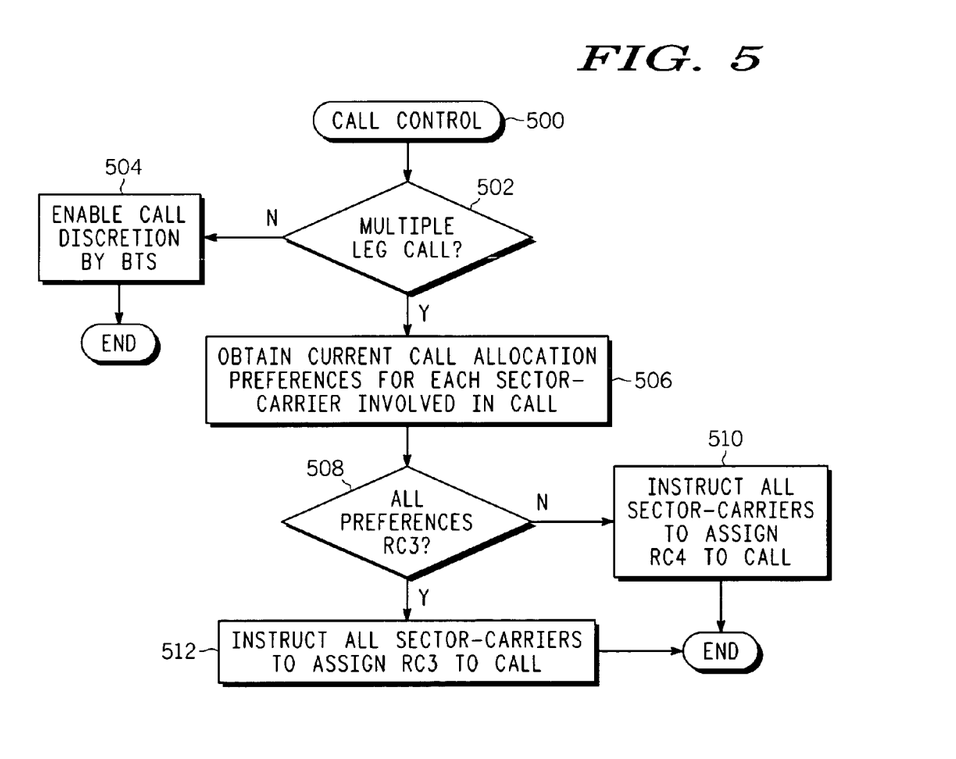
FIG. 5 is a flow chart of a call control process according to an embodiment of the invention.

FIG. 5 is a flow chart of a call control process 500 according to an embodiment of the invention. The various tasks performed in connection with process 500 may be performed by software, hardware, firmware, or any combination thereof. For illustrative purposes, the following description of process 500 may refer to elements described elsewhere herein. It should be appreciated that process 500 may include any number of additional or alternative tasks, the tasks shown in FIG. 5 need not be performed in the illustrated order, and process 500 may be incorporated into a more comprehensive procedure or process having additional functionality not described in detail herein. Although not a requirement of the invention, a BSC may perform process 500 in a practical CDMA system. Process 500 assumes that the BSC is capable of supporting a plurality of BTSs and a plurality of sector-carriers associated with the BTSs. Process 500 may be performed whenever a new call is to be requested by the BSC.

Call control process 500 begins by determining whether the new call is a single leg call or a multiple leg call (query task 502). If the new call will be a single leg call, then process 500 enables call discretion by the appropriate BTS (task 504). In other words, process 500 need not perform any call allocation techniques and, instead, allows the BTS to make the call allocation decision. If, however, the new call will be a multiple leg call, then process 500 may continue to determine how best to assign the call type.

For multiple leg calls, call control process 500 obtains the current call allocation preferences for each sector-carrier (or BTS) to be involved in the call. As described in more detail below, each call allocation preference represents the desired call type (or the desired target combination of different call types) as indicated by the respective sector-carrier, and the BTSs may provide the call allocation preferences along with a channel response or other suitable message that is generated in response to each new call setup. If all of the call allocation preferences are for RC3 calls (query task 508), then process 500 instructs all of the involved sector-carriers to assign RC3 to the new call (task 512). In the example embodiment, this instruction only occurs if all sector-carriers involved are at or below the desired RC3 usage as dictated by the call allocation determination described herein. On the other hand, if any one of the call allocation preferences is for an RC4 call, then process 500 instructs all of the involved sector-carriers to assign RC4 to the new call (task 510). In practice, this technique satisfies the requirements of the "least common denominator" sector-carrier while still maintaining the standard CDMA requirement of having the same radio configuration supporting a multiple leg call. Notably, once the BSC formulates its call allocation instructions (whether RC3 or RC4), the BTSs involved in the call are given no discretion to select a different radio configuration for the call.

Figure 6:
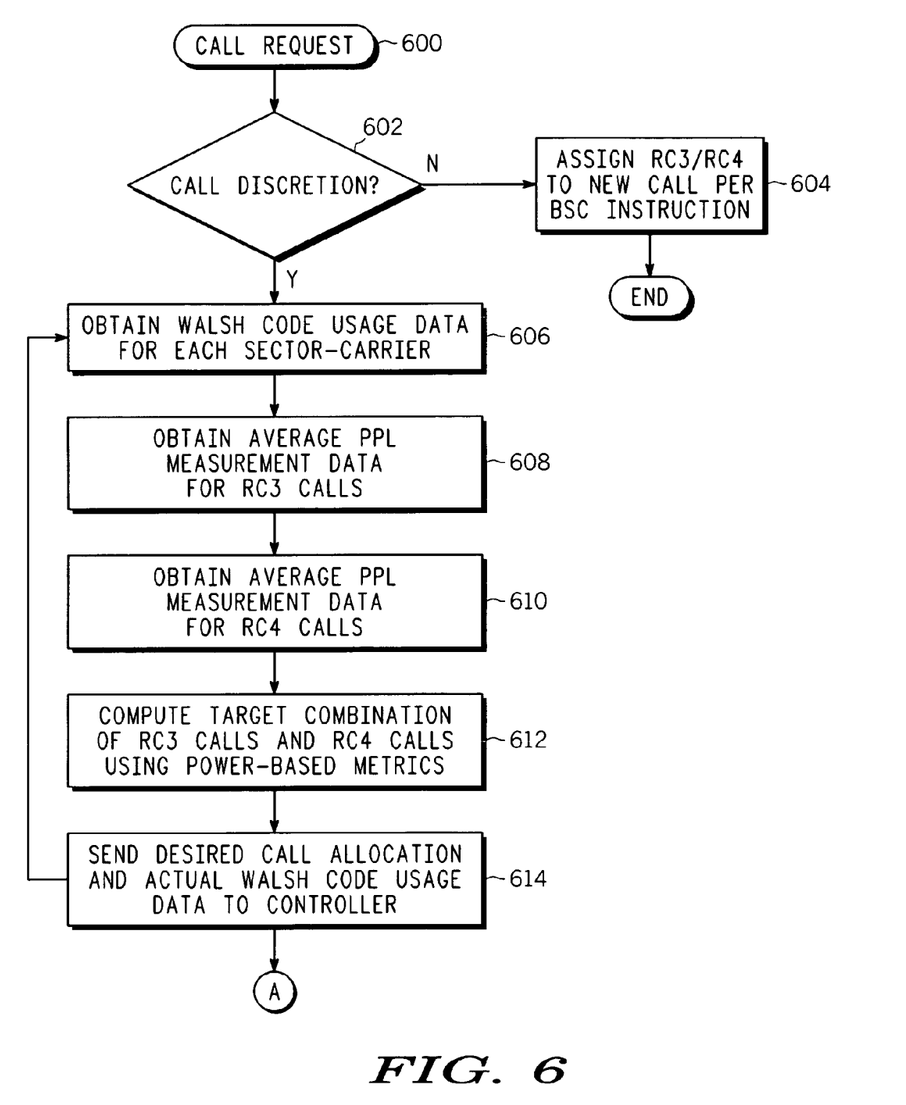
FIGS. 6 and 7 represent a flow chart depicting a call request process according to an embodiment of the invention.
Figure 7:
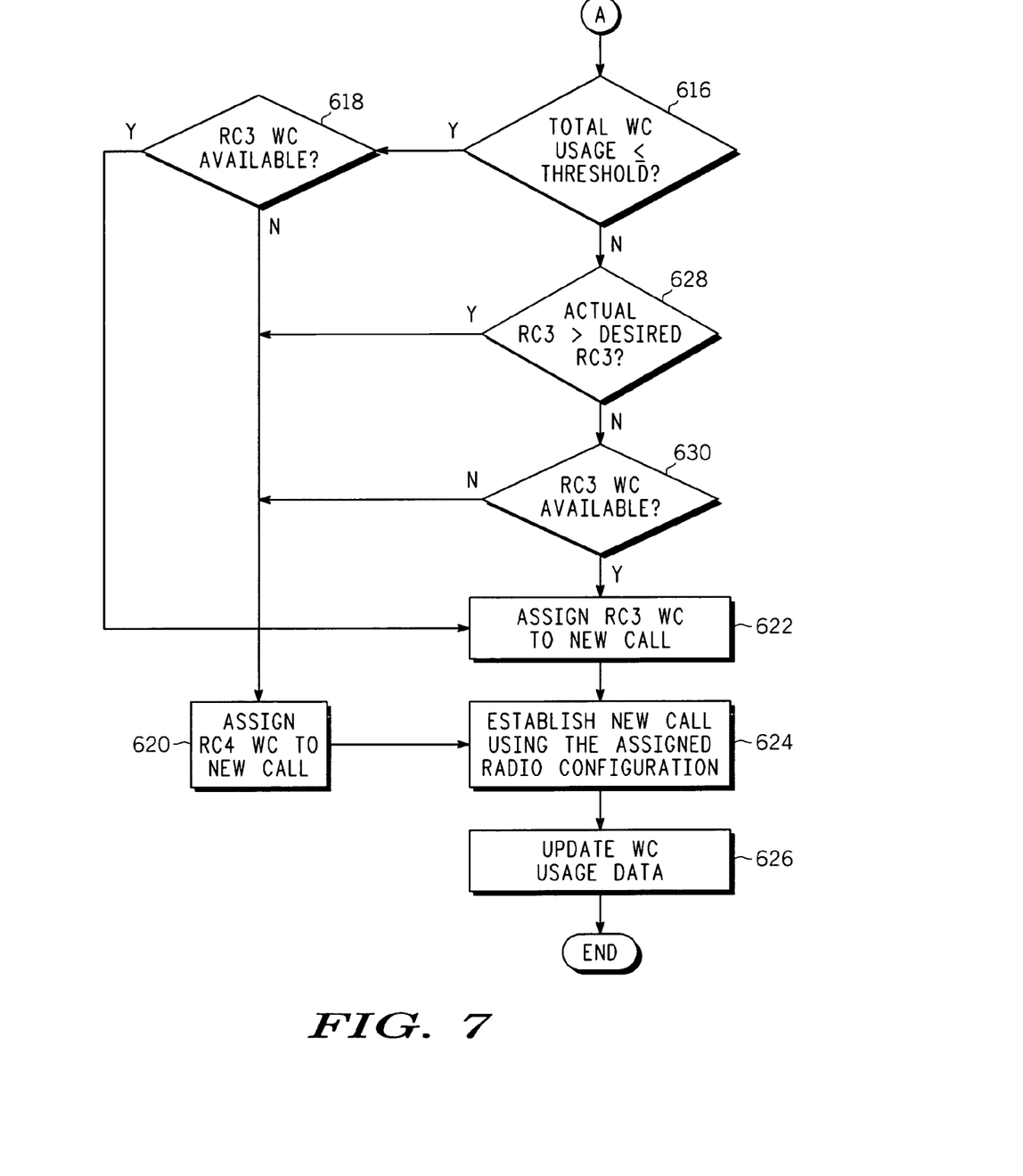

FIGS. 6 and 7 represent a flow chart depicting a call request process 600 according to an embodiment of the invention. The various tasks performed in connection with process 600 may be performed by software, hardware, firmware, or any combination thereof. For illustrative purposes, the following description of process 600 may refer to elements mentioned above in connection with FIG. 1 and FIG. 4. In practical embodiments, portions of process 600 may be performed by different elements of the described CDMA system, e.g., BSC 102 or any BTS. It should be appreciated that process 600 may include any number of additional or alternative tasks, the tasks need not be performed in the illustrated order, and process 600 may be incorporated into a more comprehensive procedure or process having additional functionality not described in detail herein.

Call request process 600 is preferably performed in response to a call request received from the controlling BSC. As described above, depending upon the requested call type (e.g., a single leg call or a multiple leg call), the BTS may have the ability to select the radio configuration for the requested call. In this regard, if the BTS has no call discretion (query task 602), then process 600 assigns a radio configuration to the new call in accordance with the instructions received from the BSC (task 604). For example, if the new call is a multiple leg call, then process 600 may assign RC3 or RC4 to the respective leg of the call, depending upon the received instruction. If no appropriate Walsh codes are available for call assignment, for example, as a result of Walsh code fragmentation, then the BTS will block the call.

If the BTS has call discretion, then call request process 600 continues to perform additional call allocation techniques. Call request process 600 may leverage existing signaling and reporting techniques supported by conventional CDMA systems. For example, process 600 may obtain Walsh code usage data for each sector-carrier associated with a BTS (task 606). In this regard, the BTS may periodically (e.g., once every two seconds or on demand in response to call requests) report call usage data for each sector-carrier to the BSC. The call usage data may include, without limitation, the total number of RC3 Walsh codes in use for each sector and their average power, the total number of RC4 Walsh codes in use for each sector and their average power, the peak RC3 Walsh code usage for the reporting interval, the peak RC4 Walsh code usage for the reporting interval, and other information that may be useful to support standard functions of the CDMA system. In the example embodiment, the BTS obtains a current total number of Walsh codes in use, where the current total number includes a sum of the number of RC3 Walsh codes actually in use and the number of RC4 Walsh codes actually in use.

In accordance with the example embodiment of the invention, the BTS obtains average PPL measurements for calls in each sector-carrier, where each sector-carrier (or the BTS itself) has a practical transmit power limit. In this regard, the BTS may obtain average PPL measurement data for RC3 calls in each sector-carrier (task 608) and average PPL measurement data for RC4 calls in each sector-carrier (task 610). In a practical implementation, the BTS may track the average PPL measurement data from the previous reporting interval. The average PPL measurements are preferably determined on a regular basis, e.g., at call set-up, because the average PPL can vary over time depending upon the location of mobile units relative to the BTS and other practical considerations. In response to the average PPL measurements and the transmit power limit of the sector-carriers, call request process 600 computes a target combination of RC3 calls and RC4 calls (task 612). In this regard, the BTS determines a desired RC3/RC4 call allocation using power-based metrics. In one practical embodiment of the invention, the target combination of calls reflects a projected maximum number of users, codes, and/or links that can be in use for the given transmit power limit. In other words, the BTS considers its practical transmit power limitations, along with the current average PPL for RC3 and RC4 calls, to generate a theoretical number of RC3 calls and/or a theoretical number of RC4 calls that results in the highest total number of users/links for the sector-carriers.

The target combination of calls, which represents the desired or preferable call allocation for the BTS, may be stored in a suitable memory location as necessary.

The BTS may also send the desired Walsh code usage, call allocation, or target combination, and the actual Walsh code usage data to the BSC for handling (task 614). Notably, a desired call allocation preference need not match the actual new call assignment, due to code fragmentation. This information may be sent to the BSC in periodic reports generated by the BTS (for example, reports sent once every two seconds or in response to each call request) or simply in response to each call allocation request. The path from task 614 back to task 606 represents the ongoing periodic nature of the determination of Walsh code usage data performed by the CDMA system. Furthermore, in a practical embodiment, tasks 606, 608, 610, 612, and 614 may be performed and repeated continuously whether or not new calls are being established.

Again, assuming that the BTS has discretion over call assignments, call request process 600 may proceed to a query task 616. Process 600 may compare the total current Walsh code usage to a threshold number (query task 616) to determine whether or not to apply the target combination of calls. As mentioned above, the threshold number may represent a number of users/links below which RC3 calls are exclusively utilized for calls in the sector-carriers. In FIG. 2, this threshold number is approximately 40. If the total current Walsh code usage is less than or equal to the threshold, then the CDMA system will attempt to assign RC3 Walsh codes to new calls, and will attempt to otherwise maximize the number of RC3 calls supported by the BTS.

As mentioned above, a single RC3 Walsh code can serve as the root of two distinct RC4 Walsh codes. If either one of the two RC4 Walsh codes are in use, then the root RC3 Walsh code will be unavailable. In other words, both RC4 Walsh codes must be available in order to "recreate" the root RC3 Walsh code. A condition known as Walsh code fragmentation exists when one of the two related RC4 Walsh codes is unavailable, thus making the root RC3 Walsh code unavailable. Referring again to call request process 600, if an RC3 Walsh code is not available (query task 618), then process 600 will instead assign an RC4 Walsh code (assuming one is available) to new calls (task 620). If Walsh code fragmentation is not an issue and an RC3 Walsh code is available, then process 600 will assign an RC3 Walsh code to new calls (task 622). In the example embodiment, the BTS determines whether to assign RC3 or RC4 to a new call. Such distributed processing may be desirable in a practical CDMA system. Nonetheless, such processing may instead be "centralized" in a suitable controller component such as the BSC, which can then provide suitable call establishment instructions to the corresponding BTS. Eventually, process 600 establishes the new call using the assigned radio configuration (task 624) and updates the Walsh code usage data (task 626) to reflect any changes, e.g., to reflect the RC3/RC4 assignment of new calls. Thereafter, process 600 may end or be repeated for the next call request.

If query task 616 determines that the total current Walsh code usage exceeds the given threshold number, then call request process 600 will not automatically attempt to select an RC3 Walsh code for use with the new call. Rather, process 600 preferably proceeds with tasks associated with the power optimization scheme described herein. As described above, for Walsh code usage beyond the threshold point, the CDMA system begins to allocate RC3 and RC4 Walsh codes to new calls in accordance with the predetermined target combination of calls. In this regard, a query task 628 determines whether the actual number of RC3 Walsh codes currently in use is greater than the desired number of RC3 Walsh codes (as dictated by the target combination). If so, then process 600 will instead assign an RC4 Walsh code (assuming one is available) to new calls (task 620). Otherwise, process 600 will attempt to assign an RC3 Walsh code to the new call.

If an RC3 Walsh code is available (query task 630), then process 600 will assign an RC3 Walsh code to the new call (task 622). If an RC3 Walsh code is unavailable, then process 600 will assign an RC4 Walsh code to the new call (task 620). Thereafter, the BTS will establish the new call using the assigned radio configuration (task 624). Process 600 may also update the Walsh code usage data (task 626) to reflect any changes, e.g., to reflect the RC3/RC4 assignment of the new call. Thereafter, process 600 may end or be repeated for the next call request. In practice, as process 600 is repeated for new calls and as the CDMA system handles terminated calls, hand-in traffic, and hand-offs, the actual number of RC3 calls will increase or decrease until it reaches the number specified by the target combination. Thereafter, RC4 calls will be assigned and established as necessary to leverage the increased Walsh code availability while remaining below the RF power limit of the BTS. Typical results for process 600 are depicted in the example graphs shown in FIGS. 2 and 3.

In accordance with one example embodiment of the invention, the BTS employs the following algorithms in connection with its calculation of the desired target combination of RC3/RC4 calls. It should be appreciated that the following algorithms, relationships, and expressions merely reflect one specific example deployment and that a practical system may utilize additional or alternative algorithms, relationships, and expressions in an equivalent manner.

The system may process the following parameters as inputs for purposes of computing the target combination of calls:

RFLimit=RF power limit (expressed as a percent of pilot power);

WCLimit=RC3 Walsh code limit (typically 61);

$PPL_{RC3}$=current average PPL for RC3 calls; and $PPL_{RC4}$=current average PPL for RC4 calls.

The system may process the above parameters in a suitable manner to generate the following output parameters:

$N_{RC3}$=desired target number of RC3 users/links; and/or $N_{RC4}$=desired target number of RC4 users/links.

In this example, the system strives to maximize the sum $(N_{RC3}+N_{RC4})$ under the following two constraints:

$$RFLimit \geq (PPL_{RC3}) \times (N_{RC3}) + (PPL_{RC4}) \times (N_{RC4});$$

and $$WCLimit \geq N_{RC3} + \frac{N_{RC4}}{2}.$$

The algebraic solution yields the following expressions:

$$N_{RC3} = \frac{MAX(2 \times WCLimit \times PPL_{RC4} - RFLimit, 0)}{2 \times PPL_{RC4} - PPL_{RC3}};$$

and $$N_{RC4} = \frac{MAX(2 \times RFLimit - 2WCLimit \times PPL_{RC3}, 0)}{2 \times PPL_{RC4} - PPL_{RC3}}.$$

In the example embodiment, the CDMA system need not determine both of the allocations for RC3 and RC4 calls. Rather, the CDMA system may only calculate $N_{RC3}$, for example, and allocate RC3 or RC4 in an appropriate manner until $N_{RC3}$ is reached. Thereafter, the CDMA system can strive to maintain $N_{RC3}$ while allocating RC4 to new calls as necessary. Alternatively, the CDMA system can compute the sum of $N_{RC3}$ and $N_{RC4}$ to predict the maximum number of users for the given RF power limit (assuming that the average PPL measurements remain somewhat stable). The maximum number of users can then be utilized in connection with other call allocation schemes, e.g., a scheme that reserves a number of RC3 codes for use as a "buffer," or a scheme that simply strives to maximize the number of RC3 codes in use at any given time.

In an alternate embodiment, the CDMA system may calculate $N_{RC3}$ and $N_{RC4}$ values using the above expressions at any number of different points in time, then apply a suitable averaging or smoothing function to the different samples to obtain the desired current target combination of RC3 and RC4 calls. Such averaging or smoothing may be desirable to consider historical load conditions over a given period of time rather than any specific load condition for a single point in time. This "filtering" feature allows the CDMA system to disregard very short term load fluctuations.

Those skilled in the art will recognize that a practical CDMA system may include other power management procedures, call traffic handling techniques, and conventional methodologies that could be merged with the techniques described above. For example, calls that are handed into a cell or a sector-carrier continue to use their existing radio configurations and, therefore, the CDMA system does not have the discretion to change the Walsh coding of such handed-in calls. As another example, a system that supports high speed data communication may employ a plurality of related RC3/RC4 Walsh codes to support a single high speed call. For example, a group of related RC4 Walsh codes may be utilized to support a high speed data call. The specific number of related codes utilized to support high data rate calls may vary from one system to another, and the number may be adjustable in response to current system requirements, load levels, power management, or the like. Due to Walsh code fragmentation, however, the requisite number or grouping of related RC4 Walsh codes may not be available at all times. To address this issue, a CDMA system may reserve an entire branch of RC3/RC4 Walsh codes for use with high speed data calls. In this regard, the reserved Walsh codes are considered to be in use at all times and the total current Walsh code usage (see FIG. 2) includes the number of Walsh codes reserved for high data rate applications.

The techniques described above may also be equivalently applied to support CDMA systems that utilize radio configurations in addition to or other than RC3 and RC4, e.g., RC1, RC2, and/or RC5. For example, for older systems (such as IS-95 systems that utilize RC2), it may be necessary to include other radio configuration codes in the total current Walsh code usage before determining the desired call allocation. In such cases, the implementation may treat all 64 bit Walsh code radio configurations (such as RC1, RC2, and RC5) as if they were RC3 for purposes of determining the proper RC3/RC4 balance. In addition, the call allocation methodology of the invention can be utilized to obtain an desired mix of different radio configuration calls where a tradeoff exists between power consumption and Walsh code availability for the different radio configurations.

While at least one example embodiment has been presented in the foregoing detailed description, it should be appreciated that a vast number of variations exist. It should also be appreciated that the example embodiment or embodiments described herein are not intended to limit the scope, applicability, or configuration of the invention in any way.

Rather, the foregoing detailed description will provide those skilled in the art with a convenient road map for implementing the described embodiment or embodiments. It should be understood that various changes can be made in the function and arrangement of elements without departing from the scope of the invention as set forth in the appended claims and the legal equivalents thereof.

What is claimed is:

1. A method for managing loading in a code division multiple access ("CDMA") communication system, said CDMA communication system being capable of establishing calls in accordance with a first radio configuration that utilizes a first category of codes, and calls in accordance with a second radio configuration that utilizes a second category of codes, said method comprising:
    obtaining average power per link/user ("PPL") measurements for calls in a sector having a transmit power limit;
    obtaining a current number of codes in use;
    if said current number is less than or equal to a threshold, assigning said first radio configuration to new calls;
    if said current number is greater than said threshold, computing a target combination of calls utilizing said first radio configuration and calls utilizing said second radio configuration in response to said average PPL measurements and in response to said transmit power limit.

2. A method according to claim 1, wherein said first radio configuration is RC3, and said second radio configuration is RC4.

3. A method according to claim 1, wherein said first category of codes comprises 64-bit Walsh codes.

4. A method according to claim 1, wherein said second category of codes comprises 128-bit Walsh codes.

5. A method according to claim 1, wherein:
    said first radio configuration has a first average PPL;
    said second radio configuration has a second average PPL; and
    said second average PPL is greater than said first average PPL.

6. A method according to claim 1, wherein obtaining average PPL measurements comprises:
    obtaining a first average PPL measurement for calls utilizing said first radio configuration; and
    obtaining a second average PPL measurement for calls utilizing said second radio configuration.

7. A method according to claim 1, wherein computing said target combination of calls reflects a projected maximum number of codes in use for said transmit power limit.

8. A method according to claim 1, further comprising assigning said first radio configuration or said second radio configuration to new calls in accordance with said target combination of calls.

9. A method for managing loading in a sector-carrier of a code division multiple access ("CDMA") communication system, said sector-carrier being capable of establishing both RC3 calls that utilize RC3 Walsh codes, and RC4 calls that utilize RC4 Walsh codes, said sector-carrier having a total transmit power limit, said method comprising:
    obtaining a first average power per link/user ("PPL") measurement for RC3 calls in said sector, and a second average PPL measurement for RC4 calls in said sector;
    obtaining a total number of Walsh codes required to support current call loading;
    if said total number is less than or equal to a threshold, maximizing the number of RC3 calls established by said sector-carrier;
    if said total number is greater than said threshold, processing said first average PPL, said second average PPL, and said total transmit power limit to calculate a target combination of RC3 calls and RC4 calls established by said sector-carrier.

10. A method according to claim 9, wherein:
    said first radio configuration has a first average PPL;
    said second radio configuration has a second average PPL; and
    said second average PPL is greater than said first average PPL.

11. A method according to claim 9, wherein said target combination reflects a projected maximum number of codes in use for said transmit power limit.

12. A method according to claim 9, further comprising establishing new calls as RC3 calls or RC4 calls in accordance with said target combination.

13. A code division multiple access ("CDMA") communication system comprising:
    a base station transceiver having a total transmit power limit and configured to establish calls in accordance with a first radio configuration utilizing a first category of codes, and calls in accordance with a second radio configuration utilizing a second category of codes, said base station transceiver being further configured to obtain average power per link/user ("PPL") measurements for calls; and
    a controller coupled to said base station transceiver, said controller comprising processing logic configured to:
        obtain a current number of codes in use by said base station transceiver;
        assign said first radio configuration to new calls supported by said base station transceiver, if said current number is less than or equal to a threshold; and
        if said current number is greater than said threshold, process said average PPL measurements and said total transmit power limit to calculate a target combination of calls utilizing said first category of codes and calls utilizing said second category of codes.

14. A system according to claim 13, wherein said first radio configuration is RC3, and said second radio configuration is RC4.

15. A system according to claim 13, wherein said target combination of calls reflects a projected maximum number of links/users considering said transmit power limit.

16. A system according to claim 13, said base station transceiver being further configured to assign said first radio configuration or said second radio configuration to new calls in accordance with said target combination of calls.

* * * * *